United States Patent [19]
Köhler

[11] Patent Number: 5,099,686
[45] Date of Patent: Mar. 31, 1992

[54] SENSOR AND METHOD FOR MEASURING THE RELATIVE VELOCITY OF AN ONCOMING MEDIUM

[75] Inventor: Heinz-Gerhard Köhler, Schönede, Fed. Rep. of Germany

[73] Assignee: Nord-Micro-Elektronik Feinmechanik AG, Frankfurt, Fed. Rep. of Germany

[21] Appl. No.: 554,730

[22] Filed: Jul. 18, 1990

[30] Foreign Application Priority Data

Jul. 18, 1989 [DE] Fed. Rep. of Germany ....... 3923753

[51] Int. Cl.$^5$ ............................................. G01P 5/165
[52] U.S. Cl. ........................................ 73/182; 73/180; 73/861.65
[58] Field of Search ...................... 73/182, 180, 861.65, 73/861.66, 861.67, 861.68

[56] References Cited

U.S. PATENT DOCUMENTS

| | | |
|---|---|---|
| 3,673,866 | 7/1972 | Alperovich et al. ................ 73/182 |
| 4,343,194 | 8/1982 | Dehart et al. ................ 73/861.65 |
| 4,730,487 | 3/1988 | DeLeo et al. ................ 73/861.65 |

FOREIGN PATENT DOCUMENTS 0312500 2/1915 Fed. Rep. of Germany ... 73/861.65

*Primary Examiner*—Donald O. Woodiel
*Attorney, Agent, or Firm*—Herbert L. Lerner; Laurence A. Greenberg

[57] ABSTRACT

A sensor for measuring the relative velocity of an oncoming medium includes a tubular and preferably radially symmetrical sensor body having a leading front end, and a wall with an inner surface defining an axial hollow space being open to the outside at the leading front end. The sensor body includes a preferably streamlined sensor head portion associated with the front end, and a remainder of the sensor body forming a sensor shaft. The wall has at least one conduit being radial or having a radial component. The at least one conduit is separated from the axial hollow space and spaced apart from the front end. The at least one conduit is open to the outside from one of the portions. A method of measuring the relative velocity of the medium includes detecting a first measured value representing the sum of the static pressure and the velocity-dependent dynamic pressure of the medium with an axial pitostatic tube discharging at the front end of a sensor body. At least one second measured value enabling splitting up of the sum is detected with at least one radial conduit in the sensor body separate from the pitostatic tube.

23 Claims, 5 Drawing Sheets

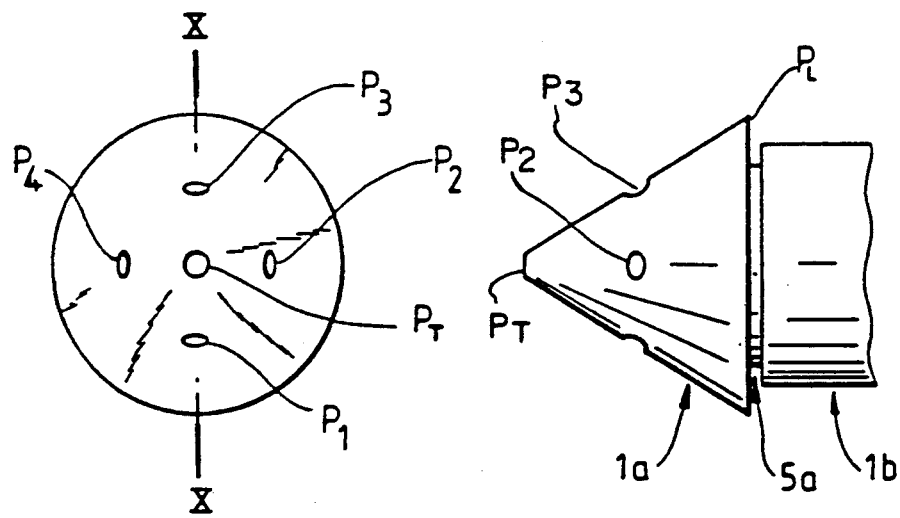
Fig. 8A
$\Delta P_\alpha = P_1 - P_3$
$\Delta P_\beta = P_2 - P_4$
Fig. 8B
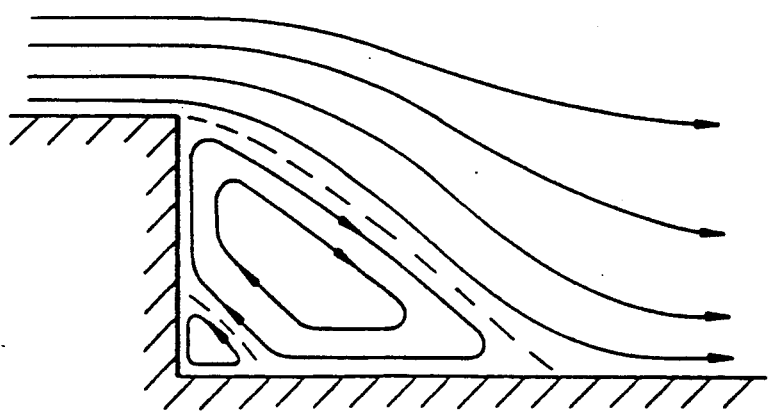
Fig. 9

SENSOR AND METHOD FOR MEASURING THE RELATIVE VELOCITY OF AN ONCOMING MEDIUM

The invention relates to a sensor for measuring the relative velocity of an oncoming medium, including a tubular and preferably radially symmetrical body, having a leading front end at which an axial hollow space defined by the inner wall of the tube opens to the outside, and at least one radial conduit extending radially or with a radial directional component, being separated from the axial hollow space and being spaced apart from the front end in the wall of the sensor body.

The invention also relates to a method for measuring the relative velocity of a medium flowing against a sensor, which includes detecting a first measured value representing the sum of the static pressure of the medium and its velocity-dependent dynamic pressure, by means of an axial pitostatic or pressure tube discharging at the front end of the sensor; and detecting a second measured value or a plurality of second measured values that enable splitting up of the sum by means of at least one radial conduit being separate from the pitostatic or pressure tube.

A conclusion can then be made from the value of the velocity-dependent component as to the value of the velocity itself and the static pressure.

Such measuring sensors, known as Prandtl's Pitot tubes or pitostatic tubes, and the measuring methods associated therewith, are used particularly in aeronautical engineering to measure the speed of aircraft. The known measurement principle, and the disadvantages thereof which the invention seeks to overcome, will be described in greater detail below in conjunction with the description of the drawings.

In order to be capable of measuring supersonic speeds, the known measuring sensors must have a structural length that assures sufficient distance between a radial conduit and a sensor shoulder. The greater the velocity to be measured, amount of effort and expense.

It is accordingly an object of the invention to provide a sensor and a method for measuring the relative velocity of an oncoming medium, which overcome the hereinafore-mentioned disadvantages of the heretofore-known methods and devices of this general type and which provide reliable measurement of supersonic speeds independent of the structural length of the sensor.

With the foregoing and other objects in view there is provided, in accordance with the invention, a sensor for measuring the relative velocity of an oncoming medium, comprising a tubular and preferably radially symmetrical sensor body having a leading front end, and a wall with an inner surface defining an axial hollow space being open to the outside at the leading front end, the sensor body including a preferably streamlined sensor head portion being associated with the front end, and a remainder of the sensor body forming a sensor shaft, the sensor head portion having a largest diameter being greater than the outside diameter of the sensor shaft, the sensor head portion having a back end facing away or being remote from the front end, and the sensor shaft having a portion adjacent the back end, the wall having at least one conduit formed therein being radial or having a radial directional component, the at least one conduit being separated from the axial hollow space and spaced apart from the front end, and the at least one conduit being open to the outside from one of the portions.

In accordance with another feature of the invention, the at least one conduit in the wall extends in the sensor head portion, and the at least one conduit includes another conduit being axial or having an axial directional component being open to the outside from the back end of the sensor head portion beyond the outside diameter of the sensor shaft.

In accordance with a further feature of the invention, the at least one conduit in the wall extends in the sensor shaft and opens from the sensor shaft to the outside directly adjacent the back end of the sensor head portion.

In accordance with an added feature of the invention, the at least one conduit is in the form of a plurality of conduits discharging to the outside and being distributed over the periphery of the sensor body.

Instead of the static pressure, the lee pressure $P_L$ is measured behind a suitably shaped step which is preferably located at the thickest part of the measuring sensor. The static pressure $P_s$ and the dynamic pressure $Q_c$ are then calculated from the lee pressure $P_L$ and the total pressure (Pitot pressure) $P_T$.

This exploits the fact that a zone of calmed flow (so-called dead water) forms behind a step-shaped shoulder, which has a defined, stationary pressure distribution.

It is particularly immediately behind the step, that a stationary velocity-dependent lee pressure $P_L$ can be measured, which is equivalent to the static pressure $P_s$ minus a suction component, approximately in accordance with the following equation:

$$P_L = P_s + c_L \cdot Q_c, \text{ where } c_L < 0.$$

The substantial advantage of the configuration according to the invention is that when the speed of sound is attained, the shock wave (or recompression shock) forms behind the dead water zone. As a result, the lee pressure itself that is detected shortly behind the step is unaffected by the shock wave. The rearward migration of the shock wave with increasing velocity is therefore harmless for measurement with a sensor according to the invention. Smooth measurement is thus attained in the total velocity range, even at maximum velocities (such as Mach 4.0), without making the sensor any longer. This is the primary advantage over conventional sensors based on Prandtl's measurement principle.

In accordance with an additional feature of the invention, the periphery of the sensor body has an annular slit formed therein behind the sensor head portion, and the sensor body has at least one measuring conduit formed therein being open into the annular slit.

Picking up the lee pressure $P_L$ by an annular slit instead of one or more radial conduits and using it for evaluation has the advantage of providing an average of the lee pressure over the circumference of the sensor, thereby achieving a certain independence of the lee pressure and thus an independence of the measuring configuration from the angle of attack of the medium.

In accordance with again another feature of the invention, the sensor head portion has a front surface oriented toward the front end, and the front surface has at least two and preferably four circumferentially spaced apart measuring bores formed in the wall and extending to the outside from the sensor head portion.

In order to not only attain an angular independence as compared with slightly oblique oncoming flows but to enable compensation for the angular dependency with an oncoming flow at high angles of attack as well, the measurement configuration can be expanded by providing the additional pressure measuring bores and associated pressure lines. Two angular components of the oncoming flow can be determined by measuring two pressure differences. The lee pressure measurement according to the invention can thus be advantageously combined with known methods of angle measurement.

In accordance with again a further feature of the invention, the sensor head portion is rotationally symmetrical and preferably has a shape selected from the group consisting of conical, ogee-shaped, parabolic, hemispherical and spherical.

An advantage that can be stressed in this connection is that the lee pressure measurement functions regardless of the form of anglular measurement, or in other words regardless of whether the measurement is performed with conical, ogee-shaped, parabolic or hemispherical sensor heads.

In accordance with again an added feature of the invention, the sensor head portion has the shape of a preferably pyramid.

The invention is accordingly not restricted to rotationally symmetrical shapes of the sensor head but instead functions even with sensor heads defined by polyhedrons, for instance having the form of a regular pyramid.

Moreover, the above-described principle of lee pressure measurement is independent of the number and any symmetry of the pressure measuring bores on the sensor head.

The primary object of replacing the conventional measurement of the static pressure (with the aforementioned problems in the supersonic range) with the measurement of a suitable lee pressure can be achieved with variously shaped sensor heads. In principle is independent of the number of signals that are additionally evaluated and in particular is independent of the number of anglular components that are additionally used for evaluation or compensation.

Various suction characteristics of the lee pressure $P_L$ over the Mach number can be attained by means of various shapes of the longitudinal cross section of the sensor head. In particular, the suction characteristic can be favorably influenced by means of various inclinations and/or curvatures of the back end of the sensor head (that is, the shape of the step). Various options are also disclosed for the location of the pressure measurement behind the step.

In accordance with again an additional feature of the invention, the back end of the sensor head portion forms a right angle, an obtuse angle or an acute angle with the sensor shaft.

In accordance with still another feature of the invention, the back end of the sensor head portion is described by rotation of a straight line segment, a curved line or a kinked line.

With the objects of the invention in view there is also provided a method of measuring the relative velocity of a medium flowing against a sensor, which comprises detecting a first measured value representing the sum of the static pressure and the velocity-dependent dynamic pressure of the medium with an axial pitostatic tube discharging at the front end of a sensor body; detecting at least one second measured value enabling splitting up of the sum with at least one radial conduit in the sensor body separate from the pitostatic tube, and detecting the at least one second measured value at the back end of a sensor head being associated with the front end of the sensor body and having a largest diameter being greater than the outside diameter of a sensor shaft formed by the remainder of the sensor body.

In accordance with another mode of the invention, there is provided a method which comprises forming the at least one second measured value as the difference between the static pressure of the medium and a velocity-dependent dynamic pressure component.

In accordance with a concomitant mode of the invention, there is provided a method which comprises determining at least two other pressure values at circumferentially spaced apart positions of the front end of the sensor head, for measuring at least one angle of the oncoming flow.

Other features which are considered as characteristic for the invention are set forth in the appended claims.

Although the invention is illustrated and described herein as embodied in a sensor and a method for measuring the relative velocity of an oncoming medium, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIGS. 8A and 8B are fragmentary elevational views of another measuring sensor according to the invention for additional detection of the angle of attack;

FIG. 9 is a diagrammatic, sectional view of the course of pressure behind a rectangular shoulder step.

Figure 1:
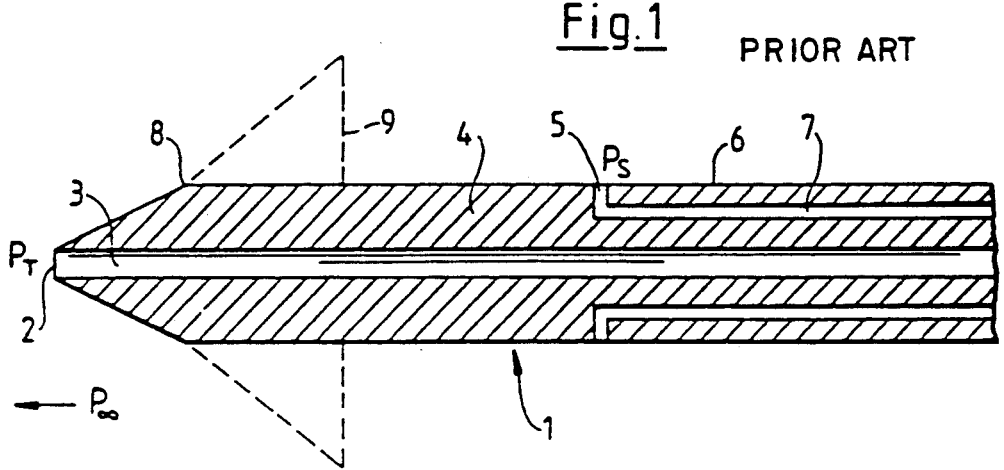
FIG. 1 is a fragmentary, diagrammatic, cross-sectional view of a conventional measuring sensor.

Referring now in detail to the figures of the drawing in which the same reference numerals are used for identical elements and first, particularly, to FIG. 1 thereof, there is seen a conventional measuring sensor, known as a Prandtl's Pitot tube or a pitostatic tube which is used along with a measuring method associated therewith particularly in aeronautical engineering for the purpose of measuring the speed of aircraft.

The known pitostatic tube shown in FIG. 1 which can, for instance, be secured to an aircraft, faces into a flow at a front end 2 thereof, that is tapered into the form of a nozzle for aerodynamic reasons. In the drawing, the flow is from the left. An oncoming flow of that kind can be engendered in particular by an attendant motion of the sensor in the medium (such as air or water), or in other words by a motion from right to left as seen in the drawing.

The sensor has a tubular body 1, at the front end 2 of which a hollow space 3 defined by the inside wall of the tube opens to the outside. The oncoming flow of the fluidic medium causes a total pressure $P_T$ to build up in the hollow space 3, which is additively composed of a static pressure $P_s$ of the medium and a velocity-dependent (kinetic) pressure $Q_c$ (dynamic pressure). The total pressure can be detected at the back end of the sensor by a non-illustrated measuring instrument.

At least one radial conduit 5 extends radially (or at least with a radial directional component) in a wall 4 of the sensor body 1 and opens to the outside in a jacket surface 6 of the sensor body 1, separately from the axial hollow space 3 and spaced apart from the front end 2. The static pressure $P_s$ of the medium prevails in the radial conduit 5. The static pressure $P_s$ can be detected at the back end of the sensor through an extension conduit 7, which may extend in the wall 4 parallel to the axial hollow space 3.

By forming the difference, $P_T - P_s$, the velocity-dependent dynamic pressure $Q_c$ can be found, and from it the associated relative velocity can be ascertained. Within certain velocity limits, the equation $Q_c = \rho v^2/2$ applies, in which $\rho$ = density of the medium and v = relative velocity.

In the known sensor, the problem is that an expansion fan with a stationary shock wave 9 (recompression shock) shown in broken lines, which is a zone with an uneven, erratic pressure course, forms in the transsonic oncoming flow region (for instance if an aircraft is travelling at supersonic velocity) behind a shoulder 8 of the nozzle-like front part. It is also noted that a second zone with an uneven pressure course, or a bow wave, forms ahead of the front end 2 of the sensor, but it plays no role in the following considerations.

With increasing velocity (increasing Mach number), the shock wave 9 migrates rearward along the measuring sensor and moves past the outlet opening or openings of the at least one radial conduit 5 at a predetermined velocity. The pressure that prevails and is measured there varies abruptly as a result, producing an uneven measurement error that cannot be compensated for.

Figure 2:
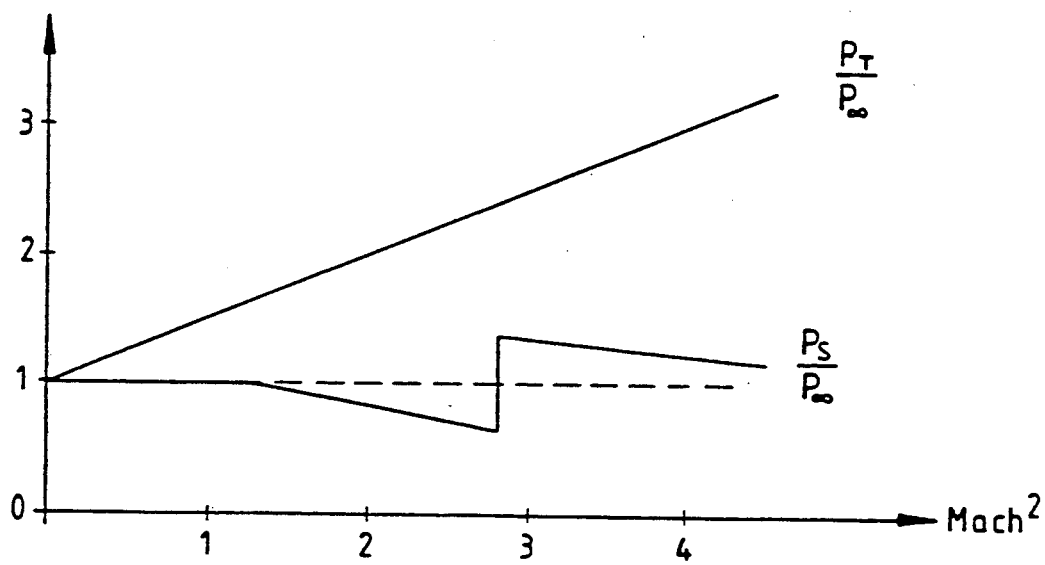
FIG. 2 is a graph showing characteristic curves of a conventional measuring sensor.

That effect is illustrated in FIG. 2, in which the pressures $P_T$ and $P_s$, that are standardized to an unimpeded, theoretically infinite pressure $P_4$ measured by the sensor, are plotted as characteristic curves over the velocity, in fact for the sake of simplicity over the square of the velocity, because in this way the dynamic pressure $Q_c$ that is part of the total pressure $P_T$ extends virtually linearly over the abscissa.

The lower characteristic curve of FIG. 2 shows an example in which the shock wave 9 moves past the outlet opening or openings of the at least one radial conduit 5 at a velocity of approximately Mach 1.7 (equivalent to a squared velocity of approximately Mach$^2$ 2.9) and there brings about the uneven pressure situation addressed above.

In order to be capable of measuring supersonic speeds, the known measuring sensors must therefore have a structural length that assures sufficient distance between the radial conduit 5 and the sensor shoulder 8. The greater the velocity to be measured, the longer the sensor must be. As mentioned above, that entails an undesirable amount of effort and expense.

Figure 3:
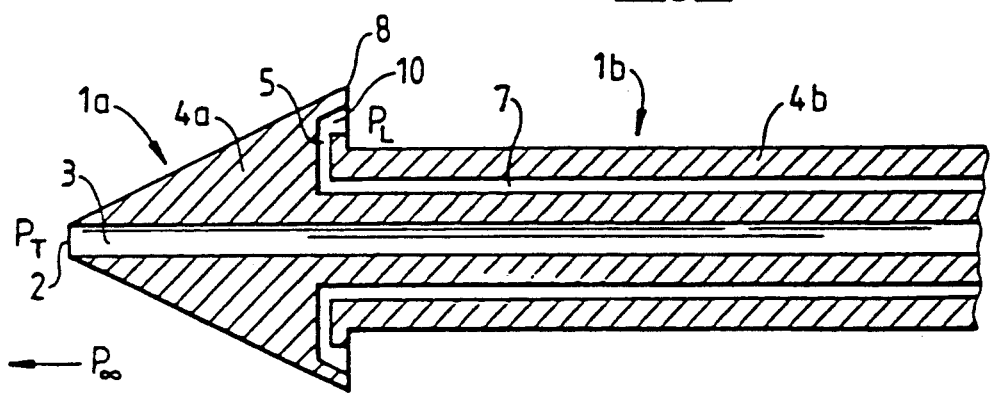
FIG. 3 is a view similar to FIG. 1 of a measuring sensor according to the invention.

The measuring sensor in accordance with the invention as shown in FIG. 3, includes a streamlined sensor head 1a associated with the front end 2 and a sensor shaft 1b formed by the rest of the sensor body. The largest diameter of the sensor head 1a (at the shoulder 8) is greater than the outside diameter of the sensor shaft 1b.

At least one radial conduit 5 extends radially (or at least with a radial directional component) in a wall 4a of the sensor head 1a and opens axially (or at least with an axial directional component) to the outside from the rear or lee end thereof by means of an axial conduit 10. An extension conduit 7 extending in a wall 4b of the sensor shaft 1b separately from the axial hollow space 3, makes it possible to detect and evaluate the (lee) pressure $P_L$ prevailing in the radial conduit 5 at the rearward end of the sensor with a non-illustrated instrument. The evaluation instrument also detects the total pressure $P_T$ building up in the axial hollow space 3.

In this configuration, the kinetic pressure $Q_c$ appears as suction. For the lee pressure $P_L$, the following equation therefore applies:

$$P_L = P_s + c_L \cdot Q_c, \text{ where } c_L < 0,$$

and in which $P_s$ again designates the static pressure of the medium.

For the total pressure $P_T$, the following definition again applies:

$$P_T = P_s + Q_c.$$

For the discussion of the measuring sensor, $c_L = -1$ has been especially selected. By linking the two equations above, the following statements can be made:

$$P_T + P_L = 2 P_s$$

and $$P_T - P_L = 2 Q_c.$$

The last two equations not only show that the velocity-indicating kinetic pressure $Q_c$ can be ascertained from the difference between the total pressure $P_{96}$ and the lee pressure $P_L$, but also that the aforementioned difference at a given velocity furnishes a measuring signal that is double that of the conventional measurement. Accordingly, the measurement sensitivity is twice as high.

However, the primary advantage is that the lee pressure $P_L$ has a smooth course over the entire velocity range, since the outlet opening of the at least one radial conduit 5 is no longer exposed to a shock wave on the lee end of the sensor head 1a. The shock wave forms in the supersonic range behind the shoulder 8 of the sensor head 1a and from there migrates rearward as the velocity increases, so that it remains harmless for the measurement of the lee pressure $P_L$.

Figure 4:
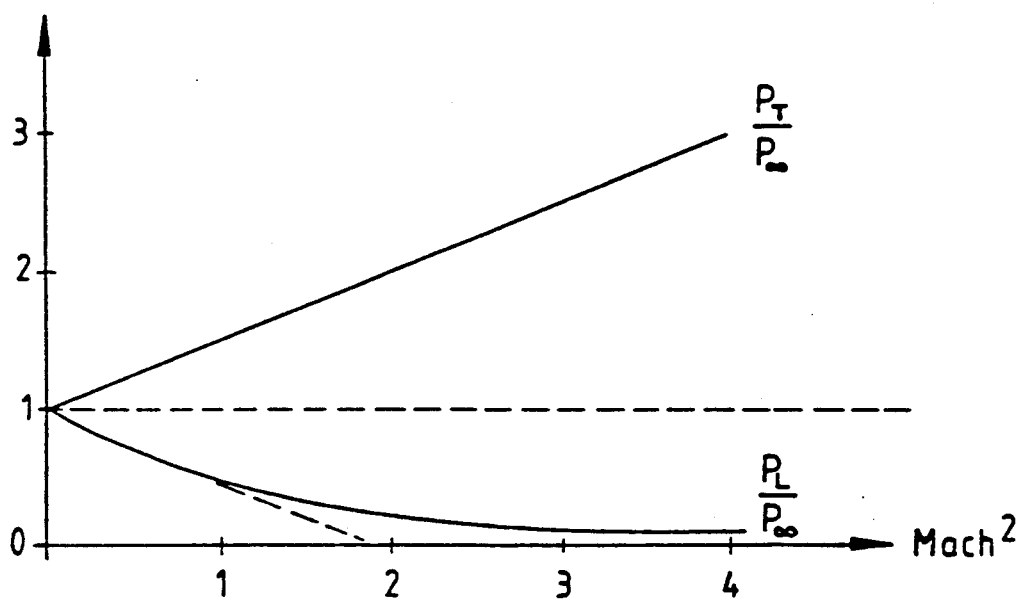
FIG. 4 is a graph showing characteristic curves of a measuring sensor according to the invention.

The course of the characteristic curves, which in this case are smooth, is shown in graphic form in FIG. 4.

A radial conduit 5 can profit from the protective action of the protruding sensor head 1a even if it extends in the wall 4b of the sensor shaft 1b and opens to the outside from the sensor shaft 1b immediately at the back end of the sensor head 1a. It is thus seen that the sensor head portion 1a has a back end facing away from the front end 2, the sensor shaft 1b has a portion adjacent said back end, and the at least one conduit 5 is open to the outside from one of the portions. Even then, the lee pressure $P_L$ will have a smooth course. However, the suction of the kinetic pressure $Q_c$ in that case is only partially effective, so that the increase in measurement sensitivity referred to above in conjunction with FIG. 3 is not as pronounced therein.

If a plurality of radial conduits 5 are distributed over the circumference of the sensor head 1a or the sensor shaft 1b and discharge to the outside, then the measurement reliability can be increased even further in each case by pneumatic averaging of their detected pressures $P_L$.

Figure 5:
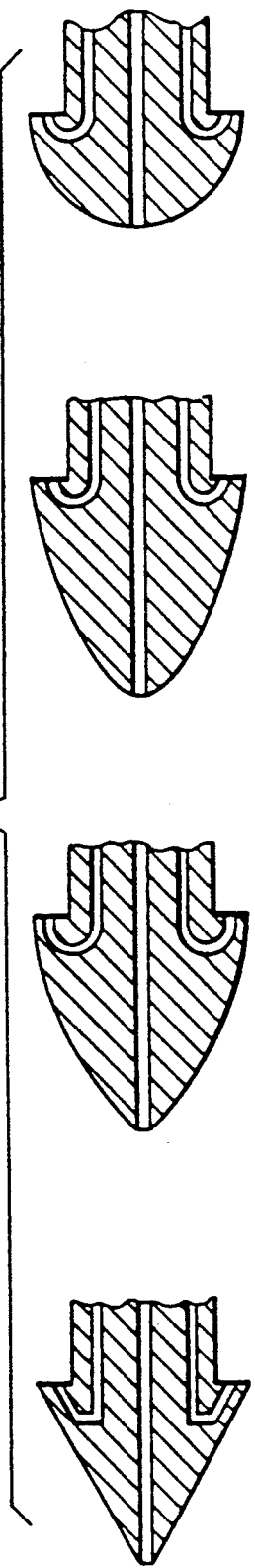
FIG. 5 is a group of fragmentary views showing variants of the basic cross-sectional shape of sensor heads according to the invention.
Figure 6:
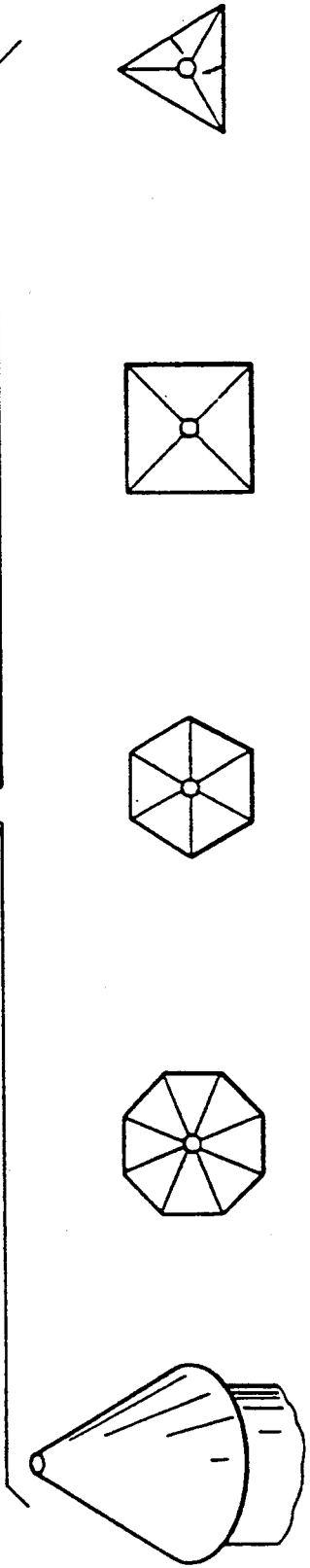
FIG. 6 is a group of elevational views showing variants of the symmetry of sensor heads according to the invention.

Any possible variations in the flow field (such as eddy currents) at the shoulder 8 of the sensor head 1a are kept as slight as possible from the outset, because the sensor head 1a is rotationally symmetrically constructed, and in particular is conical, ogee-shaped, parabolic, or hemispherical, as seen in FIG. 5. However, the invention is not restricted to such shapes of the sensor head 1a. It also functions with sensor heads which are defined polyhedrally, for instance those having the shape of a regular pyramid, as seen in FIG. 6.

Figure 7:
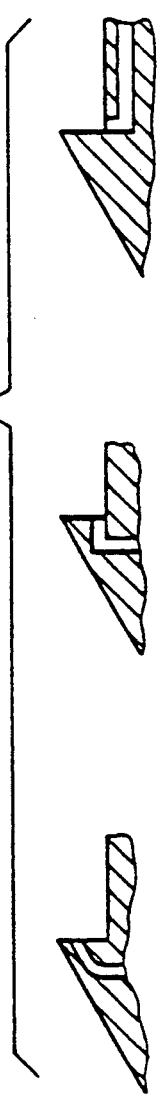
FIG. 7 is a group of fragmentary, cross-sectional views showing variants of embodiments of the back ends of sensor heads according to the invention.
Figure 10:
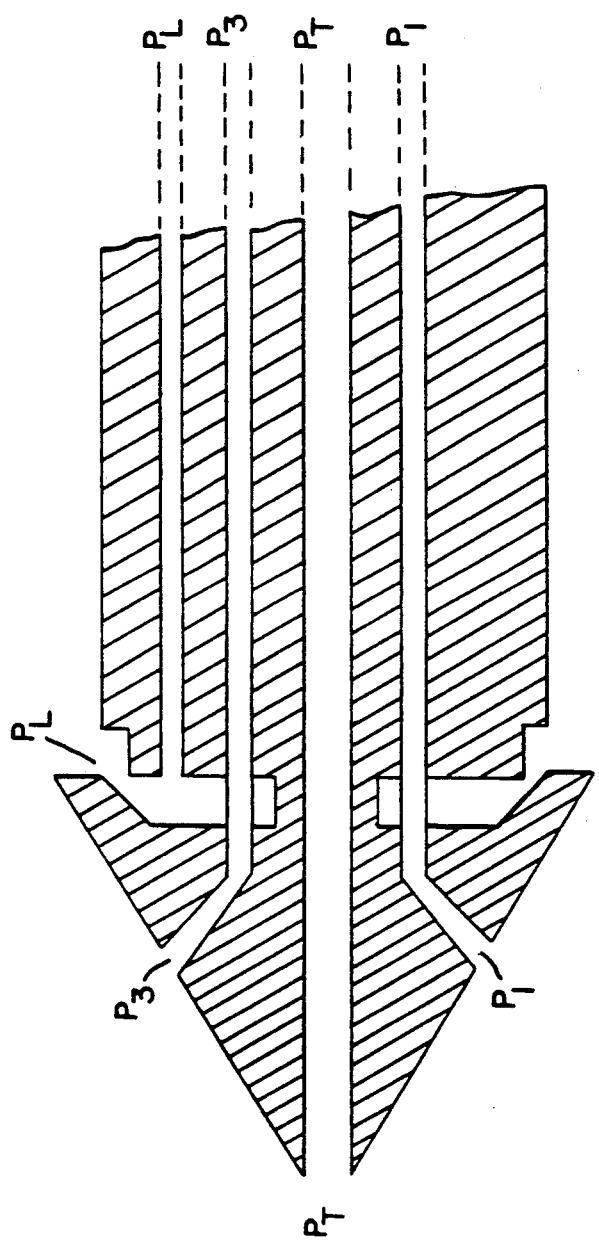
FIG. 10 is a cross-section taken along the line X—X in FIG. 8.

Different suction characteristics $P_L$ of the outlet opening or openings of the at least one radial conduit 5 and thus different measurement sensitivities of the sensor can be attained by means of different inclinations and/or curvatures of the lee end of the sensor head, as seen in FIG. 7.

If two measuring bores extend in the wall 4a of the sensor head 1a, are spaced apart circumferentially and lead to the outside eccentrically at the front of the sensor head 1a, but preferably symmetrically with respect to the longitudinal axis of the sensor as shown in FIG. 8, a pressure difference $P_1 - P_3$ can, for instance, be measured. The pressure difference is proportional to an angular component $\alpha$ of the oncoming flow and enables a conclusion to be drawn as to the angle $\alpha$ at which the medium approaches the sensor, relative to the longitudinal axis of the sensor within a plane defined by the two measuring bores and the longitudinal axis of the sensor.

The use of others of such measuring bores, which are offset from the aforementioned pair of measuring bores by an angle, as shown for instance in a plan view of the sensor tip in FIG. 8, again serves to increase the reliability and accuracy of the measurement, particularly when large angles of attack are detected, and it enables detection of a second angle component $\beta$ of the oncoming flow, or in other words its complete spatial directional description relative to the longitudinal axis of the sensor. The second angle component $\beta$ is preferably in a plane that extends orthogonally to the plane defined by the first two measuring bores. Accordingly, the angular offset of a second pair of measuring bores relative to the first pair of measuring bores is preferably 90°, as seen in a plan view of the sensor tip in FIG. 8.

FIG. 8 also shows a step-shaped shoulder, that is a step-shaped transition from the sensor head 1a to the sensor shaft 1b, with a rotationally symmetrical construction over the entire periphery of the sensor, and an annular slit 5a which is likewise formed over the periphery of the sensor. If the lee pressure $P_L$ is picked up by an annular slit 5a of this type, instead of by one or more radial conduits 5 and is used for evaluation, then an averaging of the lee pressure over the circumference of the sensor is advantageously effected, which results in a certain independence of the lee pressure and thus of the measuring configuration from the angle of attack of the medium. The annular slit 5a can carry its pressure values to an evaluation unit through a radial conduit or some other line.

Finally, in FIG. 9 the flow course behind a rectangular shoulder step is shown, in order to explain the measurement of lee pressure. The lee pressure can be detected (picked up) at a point in the region of the closed return flow.

I claim:

1. Sensor for measuring the relative velocity of an oncoming medium, comprising:
   a tubular sensor body having a leading front end, and a wall with an inner surface defining an axial hollow space being open to the outside at said leading front end,
   said sensor body including an integral sensor head associated with said front end, and a remainder of said sensor body forming a sensor shaft,
   said sensor head having a largest diameter being greater than the outside diameter of said sensor shaft,
   said sensor head having a back end portion facing away from said front end, and said sensor shaft having a portion adjacent said back end portion,
   said wall having at least one conduit formed therein with a radial directional component,
   said at least one conduit being separated from said axial hollow space and spaced apart from said front end, and
   said at least one conduit being open to the outside from one of said portions.

2. Sensor according to claim 1, wherein said tubular body is radially symmetrical.

3. Sensor according to claim 1, wherein said at least one conduit extends radially.

4. Sensor according to claim 1, wherein said sensor head has a streamlined shape.

5. Sensor according to claim 1, wherein said at least one conduit in said wall extends in said sensor head, and said at least one conduit includes another conduit with an axial directional component being open to the outside from the back end of said sensor head beyond the outside diameter of said sensor shaft.

6. Sensor according to claim 5, wherein said other conduit extends axially.

7. Sensor according to claim 1, wherein said at least one conduit in said wall extends in said sensor shaft and opens from said sensor shaft to the outside directly adjacent the back end of said sensor head.

8. Sensor according to claim 1, wherein said at least one conduit is in the form of a plurality of conduits discharging to the outside and being distributed over the periphery of said sensor body.

9. Sensor according to claim 1, wherein the periphery of said sensor body has an annular slit formed therein behind said sensor head, and said sensor body has at least one measuring conduit formed therein being open into said annular slit.

10. Sensor according to claim 1, wherein said sensor head portion has a front surface oriented toward said front end, and said front surface has at least two circumferentially spaced apart measuring bores formed in said wall and extending to the outside from said sensor head.

11. Sensor according to claim 10, wherein said at least two measuring bores are in the form of four measuring bores.

12. Sensor according to claim 1, wherein said sensor head is rotationally symmetrical.

13. Sensor according to claim 1, wherein said sensor head is rotationally symmetrical and has a shape selected from the group consisting of conical, ogee-shaped, parabolic, hemispherical and spherical.

14. Sensor according to claim 1, wherein said sensor head has the shape of a pyramid.

15. Sensor according to claim 1, wherein the back end of said sensor head forms a right angle with said sensor shaft.

16. Sensor according to claim 1, wherein the back end of said sensor head forms an obtuse angle with said sensor shaft.

17. Sensor according to claim 1, wherein the back end of said sensor head forms an acute angle with said sensor shaft.

18. Sensor according to claim 1, wherein the back end of said sensor head is described by rotation of a straight line segment.

19. Sensor according to claim 1, wherein the back end of said sensor head is described by rotation of a curved line.

20. Sensor according to claim 1, wherein the back end of said sensor head is described by rotation of a kinked line.

21. Method of measuring the relative velocity of a medium flowing against a sensor, which comprises:
    detecting a first measured value representing the sum of the static pressure and the velocity-dependent dynamic pressure of the medium with an axial pitostatic tube discharging at the front end of a sensor body;
    detecting at least one second measured value enabling splitting up of the sum with at least one radial conduit in the sensor body separate from the pitostatic tube, and
    detecting the at least one second measured value at the back end of a sensor head being associated with the front end of the sensor body and having a largest diameter being greater than the outside diameter of a sensor shaft formed by the remainder of the sensor body.

22. Method according to claim 21, which comprises forming the at least one second measured value as the difference between the static pressure of the medium and a velocity-dependent dynamic pressure component.

23. Method according to claim 21, which comprises determining at least two other pressure values at circumferentially spaced apart positions of the front end of the sensor head, for measuring at least one angle of the oncoming flow.

* * * * *